UNITED STATES PATENT OFFICE.

ERICH DEHNEL, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF BADEN.

PROCESS OF PRODUCING SOLUBLE TANNING AGENTS.

1,133,108.     Specification of Letters Patent.     Patented Mar. 23, 1915.

No Drawing.     Application filed June 30, 1913. Serial No. 776,545.

*To all whom it may concern:*

Be it known that I, ERICH DEHNEL, citizen of the German Empire, residing at Ludwigshafen-on-the-Rhine, Germany, have invented a new and useful Process of Producing Soluble Tanning Agents, of which the following is a specification.

Several of the natural tanning agents, whether in the form of extract, or not, have the undesirable property of being either only difficultly soluble, or insufficiently soluble, in cold water. Thus for instance the ingredients of the valuble quebracho extract which possess tanning properties are, in a large proportion, insoluble, or difficultly soluble. I have found that such natural tanning extracts can be converted into products which are readily soluble in cold water by treating them with soluble condensation products of aromatic phenols, which products possess at least one hydroxyl group and at least one salt forming group, such for instance as the sulfonic acid group. Such condensation products can be formed either in the presence or absence of formaldehyde, the formaldehyde when used apparently taking part in the formation of the condensation product. When the condensation is carried out in the presence of formaldehyde, the reaction can be effected either by treating a phenolic body with formaldehyde in the presence of dilute acid and then sulfonating the insoluble condensation products by treatment with strong sulfuric acid until they are soluble in water, or the reaction product of a phenolic body with concentrated sulfuric acid, or a phenol sulfo acid, or a mixture of a phenol and a phenol sulfoacid, can be treated with formaldehyde. The action of the formaldehyde on the sulfonation products of the phenolic body is preferably effected under mild conditions, that it to say, while avoiding too high a temperature, or too great an excess of formaldehyde as otherwise the well-known products, insoluble in water, may result. When the condensation products are produced in the absence of formaldehyde, it is preferred to carry out the reaction by heating a phenol sulfonic acid under diminshed pressure and, if desired, a condensation agent (such, for instance, as phosphorous trichlorid, phosphorous oxy-chlorid, or thionyle chlorid) can be added during the reaction, or the products obtained by condensation without the addition of such agent can be subsequently treated therewith.

The process of my invention gives rise to products which are soluble in cold water and are therefore eminently adapted for use in tanning. The said process can be carried out either by adding the said condensation product to the prepared tanning extract, or to the difficultly soluble parts thereof. Or it is equivalent to add the said product to the thin solution which is at first obtained and then subsequently to concentrate the treated solution. The mixtures can be effected, or maintained, either at ordinary temperatures, or at raised temperatures. In some cases, the addition of the condensation product to the tanning extract tends to bleach the said extract, and this is a further advantage.

The following example will serve to illustrate further the nature of my invention and the manner of performing the same, but the invention is not limited to this example. The parts are by weight. Treat 500 parts of quebracho extract (such as can be obtained directly by simple extraction of quebracho wood, with water, and possesses a specific gravity of about from 18° to 20° Bé. at a temperature of 40° C.) with 200 parts of the sodium salt of the product obtained from formaldehyde and cresol-sulfonic acid, as described in Example 1 of the specification of British Patent No. 8511 A. D. 1912, dissolved in 100 parts of water. After stirring for a short time, the extract, which is at first thick and viscous, becomes thin and is then soluble in water. In a similar manner, other condensation products of the kind aforesaid can be employed. Instead of quebracho wood extract, other vegetable tanning extracts, such for instance as mangrove and chestnut, can be treated with similar results.

Now what I claim is:—

1. The process of converting difficultly soluble or insufficiently soluble tanning extracts into more soluble compounds by treating such difficultly soluble or insufficiently soluble extracts with a soluble condensation product of an aromatic phenol, which condensation product possesses at least one hydroxyl group and also at least one salt-forming group.

2. The process of converting difficultly soluble or insufficiently soluble tanning extracts into more soluble compounds by treating such difficultly soluble or insufficiently soluble extracts with a condensation product obtainable by acting on cresol with sulfuric acid and formaldehyde, which condensation product possesses at least one hydroxyl group and at least one sulfonic acid group and is soluble in water, yielding an almost colorless solution which becomes deeply colored on the addition of a solution of a ferric salt.

In testimony whereof I have hereunto set my hand in the presence of two subscribing witnesses.

ERICH DEHNEL.

Witnesses:
J. ALEC. LLOYD,
JOSEPH PFEIFFER.